Feb. 13, 1951     P. A. FASOLI     2,541,645
WATER SEAL FOR OIL LUBRICATED BEARINGS
Filed Jan. 8, 1947
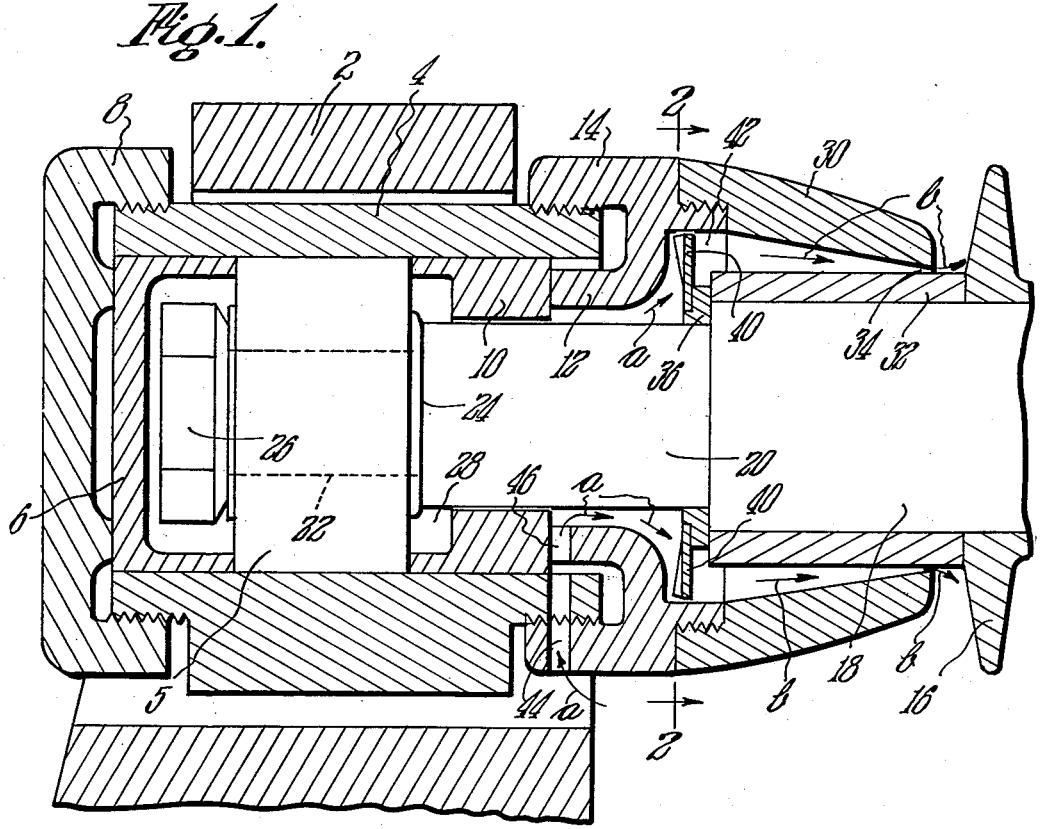
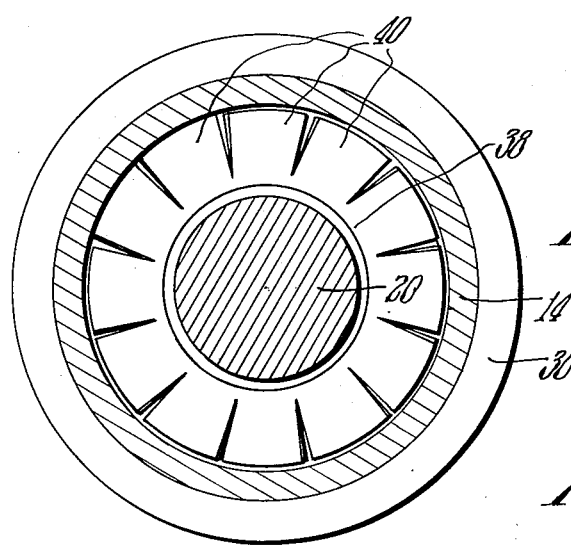
INVENTOR.
Paul A. Fasoli.
BY Walter C. Ross
Attorney.

Patented Feb. 13, 1951

2,541,645

UNITED STATES PATENT OFFICE 2,541,645

WATER SEAL FOR OIL LUBRICATED BEARINGS

Paul A. Fasoli, Granville, N. Y., assignor to The Sandy Hill Iron & Brass Works, Hudson Falls, N. Y., a corporation of New York Application January 8, 1947, Serial No. 720,850

1 Claim. (Cl. 308—187.1)

This invention relates to improvements in bearings for shafts and is directed more particularly to lubricated shaft bearings having means associated therewith to prevent the entrance of water into the bearings.

The principal objects of the invention are directed to the provision of a shaft bearing having means associated therewith to direct water away from and prevent the entrance of water into the bearing.

The novel features of the invention are adapted for broad application but will be found to be particularly adapted for shafts of table rolls for supporting the Fourdrinier wire of a paper making machine.

As is well known, it is usual to provide table rolls for supporting a traveling Fourdrinier wire which carries paper making material consisting of a large amount of water having fibers therein.

The table rolls are rotated at a considerable speed and as water is eliminated from the stock on the wire it tends to enter the bearings in which opposite ends of the table roll shaft are rotatable.

According to this invention, means is provided to eliminate the entrance of water into the bearing and is accomplished by a novel combination and arrangement of parts to be more fully hereinafter referred to.

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawings wherein:

Fig. 1 is a longitudinal sectional elevational view of a bearing construction embodying the novel features of the invention; and Fig. 2 is a sectional elevational view on the line 2—2 of Fig. 1.

Referring now to the drawings more in detail, the invention will be fully described.

A bracket or housing 2 is provided in which is mounted in any suitable manner a tubular bearing sleeve 4, as shown. An outer race 5 of an anti-friction bearing is disposed in the sleeve 4, an outer forward thrust member 6 in the sleeve 4 abuts the race 5 and a cap 8 in threaded engagement with the outer forward end of sleeve 4 abuts thrust member 6.

An inner thrust member 10 within the inner end of the sleeve 4 is in abutting engagement with the inner rear end of bearing race 5.

An inner member 14 has an annular outer forward portion threadedly engaging the inner rear end of sleeve 4 and an annular inner portion 12 spaced radially inwardly therefrom and concentrically related thereto and is provided with a rearwardly extending annular portion, as shown. The inner portion 12 is in abutting engagement with the thrust member within the inner rear end of the sleeve 4 and is spaced from the shaft, as shown.

The end portion of a table roll is represented by 16 and the shaft thereof is represented by 18. A reduced portion 20 of the shaft has an endmost further reduced portion 22 which abuts an inner race 24 of the anti-friction bearing and a nut 26 is in threaded engagement with the extremity of the shaft part 22. A reservoir 28 for lubricant is provided by the parts, as shown, and this may be supplied with lubricant in any well known manner.

A nozzle member 30 is provided with a longitudinal bore and has its forward end in threaded engagement with the rearwardly extending annular portion of the inner member 14 and extends rearwardly therefrom and terminates in a rear free end, as shown. The bore of the nozzle converges radially inwardly and to the free end of said nozzle and surrounds a tubular member 32 on the shaft 18 to provide therewith a restricted outlet, as shown.

An air propeller has a hub 36 fixed in a suitable manner to the shaft part 20 and a disc part 38 which is formed with a plurality of vanes 40. The propeller is rotatable with the shaft 18 in an air chamber 42 which is formed by the nozzle construction consisting of the members 14 and 30. Said chamber 42 is separate from the chamber 28.

An air inlet 44 is provided which is in communication with an air inlet 46 leading into chamber 42. As the shaft and air propeller are rotated air is drawn inwardly through the passages or inlets 44 and 46 as indicated by arrows $a$. The action is such that the air so drawn in is propelled outwardly in the direction of arrows $b$ through the restricted annular outlet 34 so as to eliminate water on the rotating parts and thus prevent its entrance into the bearing.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claim are therefore intended to be embraced therein.

What it is desired to claim and secure by Letters Patent of the United States is:

The combination of the shaft end of a table roll with a bearing construction therefor comprising in combination, an elongated tubular bearing sleeve having an axial bore, an antifriction bearing in which said shaft end is rotatable having an outer race in said bore, an outer forward thrust member in an outer forward end of said sleeve in abutment with an outer forward end of said outer bearing race, a cap in threaded engagement with the outer forward end of said sleeve and being in abutting engagement with said outer thrust member, an inner rear thrust member in an inner rear end of said sleeve in abutting engagement with an inner rear end of said outer bearing race, an inner rear member at the inner rear end of said sleeve having forward radially spaced concentrically related outer and inner annular portions and a rearwardly extending rear portion with the outer annular portion threadedly engaging the inner rear end of said sleeve and the inner annular portion extending into the inner rear end of said sleeve into abutting engagement with said inner thrust member and said rearwardly extending portion being spaced radially outwardly from said shaft, an elongated nozzle provided with a longitudinal bore having a forward end in threaded engagement with said rearwardly extending annular portion of said inner member and extending rearwardly away therefrom and terminating in a free end, the bore of said nozzle converging radially inwardly and longitudinally of said shaft to the free end of said nozzle, air impeller means fixed on said shaft within the bore of said nozzle and forwardly of the free end thereof, and said inner member and inner rear end of said sleeve provided with aligned air inlets into the space between said shaft and inner portion of said inner member.

PAUL A. FASOLI.

REFERENCES CITED

The following references are of record in the file of this patent:

UNITED STATES PATENTS

| Number | Name | Date |
|---|---|---|
| 1,463,018 | Junggren | July 24, 1923 |
| 1,607,222 | Wallgren | Nov. 16, 1926 |
| 1,715,597 | Haug | June 4, 1929 |
| 2,014,859 | Mitchell | Sept. 17, 1935 |
| 2,223,748 | Thoren | Dec. 3, 1940 |